US012266885B2

(12) United States Patent
Delgadillo et al.

(10) Patent No.: US 12,266,885 B2
(45) Date of Patent: Apr. 1, 2025

(54) SEAL RETAINER WITH SEAL EXPANSION COMPENSATION FEATURES

(71) Applicant: Aptiv Technologies AG, Schaffhausen (CH)

(72) Inventors: Carlos Armando Gonzalez Delgadillo, Saltillo (MX); Pedro Yabur Pacheco, Saltillo (MX)

(73) Assignee: Aptiv Technologies AG, Schaffhausen (CH)

( * ) Notice: Subject to any disclaimer, the term of this patent is extended or adjusted under 35 U.S.C. 154(b) by 379 days.

(21) Appl. No.: 18/079,153

(22) Filed: Dec. 12, 2022

(65) Prior Publication Data

US 2024/0195120 A1 Jun. 13, 2024

(51) Int. Cl.
*H01R 13/52* (2006.01)
*H01R 13/506* (2006.01)

(52) U.S. Cl.
CPC ......... *H01R 13/521* (2013.01); *H01R 13/506* (2013.01)

(58) Field of Classification Search
None
See application file for complete search history.

(56) References Cited

U.S. PATENT DOCUMENTS 4,998,896 A * 3/1991 Lundergan ........... H01R 13/443 439/595
5,613,868 A * 3/1997 Ohsumi ............. H01R 13/5221 439/275
5,766,039 A * 6/1998 Abe ................... H01R 13/5208 439/587
6,116,938 A * 9/2000 Myer ................. H01R 13/6272 439/271
6,527,586 B2 * 3/2003 Okamura ........... H01R 13/5208 439/587
7,371,115 B1 5/2008 Hsieh et al.
8,647,132 B2 * 2/2014 Kuroda .............. H01R 13/5227 439/271
9,231,348 B2 1/2016 Kanemura
10,389,061 B2 * 8/2019 McDowell ......... H01R 13/4367
11,189,952 B2 * 11/2021 Miyakawa ......... H01R 13/4365
(Continued)

FOREIGN PATENT DOCUMENTS

WO WO-2010050336 A1 * 5/2010 ......... H01R 13/5208

OTHER PUBLICATIONS

"Extended European Search Report"; European Patent Office; mailed on Feb. 22, 2024; 11 Pages.

*Primary Examiner* — Tho D Ta
(74) *Attorney, Agent, or Firm* — Billion & Armitage

(57) ABSTRACT

An electrical connector assembly includes a connector housing defining a plurality of terminal cavities in which electrical terminals attached to wire cables are received, a mat seal formed of a compliant material and having a plurality of seal apertures through which the electrical terminals are inserted into the plurality of terminal cavities, and a seal retainer. The mat seal is disposed between the seal retainer and the connector housing and wherein the seal retainer is connected to the connector housing by a flexible member configured to urge the mat seal into contact with the connector housing and allow longitudinal movement of the seal retainer relative to the connector housing. A method of assembling such an electrical connector is also provided.

18 Claims, 6 Drawing Sheets

(56) References Cited

U.S. PATENT DOCUMENTS

| | | | | |
|---|---|---|---|---|
| 11,239,596 | B2 * | 2/2022 | Miyakawa ......... | H01R 13/4365 |
| 11,367,977 | B2 * | 6/2022 | Boruszewski ..... | H01R 13/6581 |
| 2011/0117780 | A1 * | 5/2011 | Ishida ................ | H01R 13/5208 439/589 |
| 2022/0029349 | A1 | 1/2022 | Kobayashi et al. | |

* cited by examiner

SEAL RETAINER WITH SEAL EXPANSION COMPENSATION FEATURES

TECHNICAL FIELD

This application is directed to a seal retainer with seal expansion compensation features suited for application in an electrical connector.

BACKGROUND

Mat seals are compliant seals that are used to provide protection from environmental contaminants for electrical terminals within a housing of an electrical connector and are secured to the housing by a seal retainer. Mats seals typically have a number of seal apertures through which the electrical terminals are inserted. Mat seals expand as the electrical terminals are inserted through the seal apertures. In order to accommodate the expansion of the mat seal, a gap is typically formed between the seal and the retainer to allow a space for the mat seal to expand. This gap is also used to accommodate thermal expansion of the mat seal, since the material used to form most mat seals typically has a higher coefficient of thermal expansion than the materials used to form the housing and retainer. However, this gap allows movement of the mat seal between the housing and retainer and bowing of the mat seal as the terminals are inserted into the seal apertures. This movement and bowing may cause misalignment of the seal apertures with the terminal cavities in the housing that can cause difficulty in assembling the connector and/or defects in the connector assembly. Therefore, it is desirable to minimize this gap to reduce movement and bowing of the mat seal. Since the gap must also accommodate thermal expansion, reducing this gap can cause damage to the connector assembly by seal expansion exceeding the space provided by the gap.

SUMMARY

According to one or more aspects of the present disclosure, an electrical connector assembly includes a connector housing defining a plurality of terminal cavities in which electrical terminals attached to wire cables are received, a mat seal formed of a compliant material and having a plurality of seal apertures through which the electrical terminals are inserted into the plurality of terminal cavities, and a seal retainer. The mat seal is disposed between the seal retainer and the connector housing and wherein the seal retainer is connected to the connector housing by a flexible member configured to urge the mat seal into contact with the connector housing and allow longitudinal movement of the seal retainer relative to the connector housing.

According to one or more aspects of the present disclosure, a method of assembling an electrical connector includes the steps of:

- providing a connector housing defining a plurality of terminal cavities;
- aligning a plurality of seal apertures of a mat seal with the plurality of terminal cavities;
- attaching a seal retainer to the connector housing via a flexible member, wherein the mat seal is disposed between the seal retainer and the connector housing and wherein the seal retainer is configured to urge the mat seal into contact with the connector housing and allow longitudinal movement of the seal retainer relative to the connector housing; and
- inserting electrical terminals attached to wire cables through the plurality of seal apertures and into the plurality of terminal cavities.

BRIEF DESCRIPTION OF THE DRAWINGS

The present invention will now be described, by way of example with reference to the accompanying drawings, in which.

DETAILED DESCRIPTION

Figure 1:
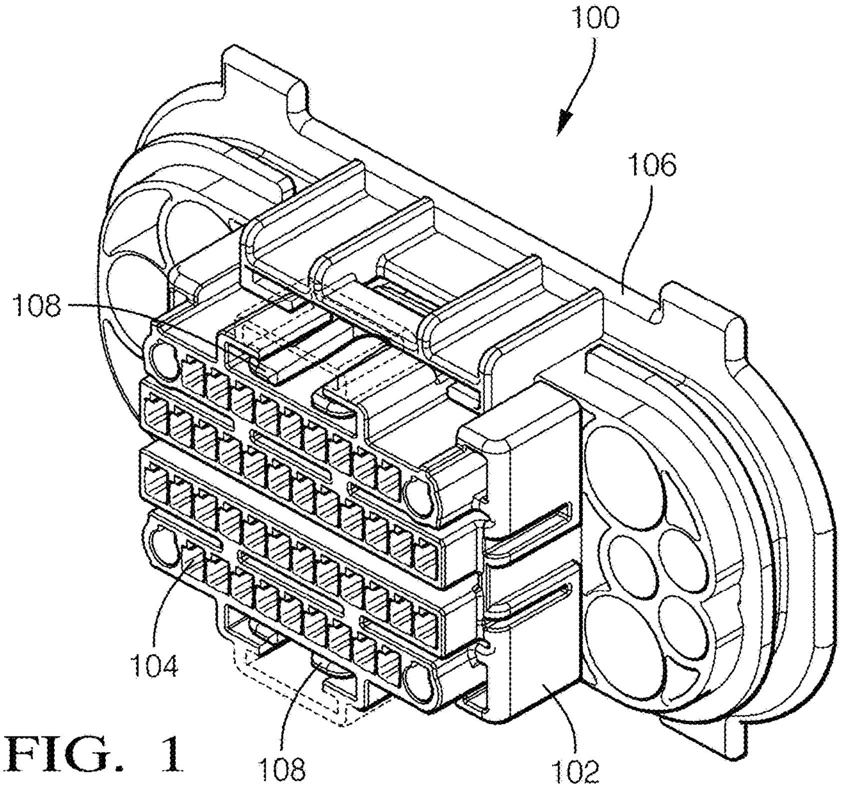
FIG. 1 illustrates an isometric view of an electrical connector assembly according to some embodiments.
Figure 2:
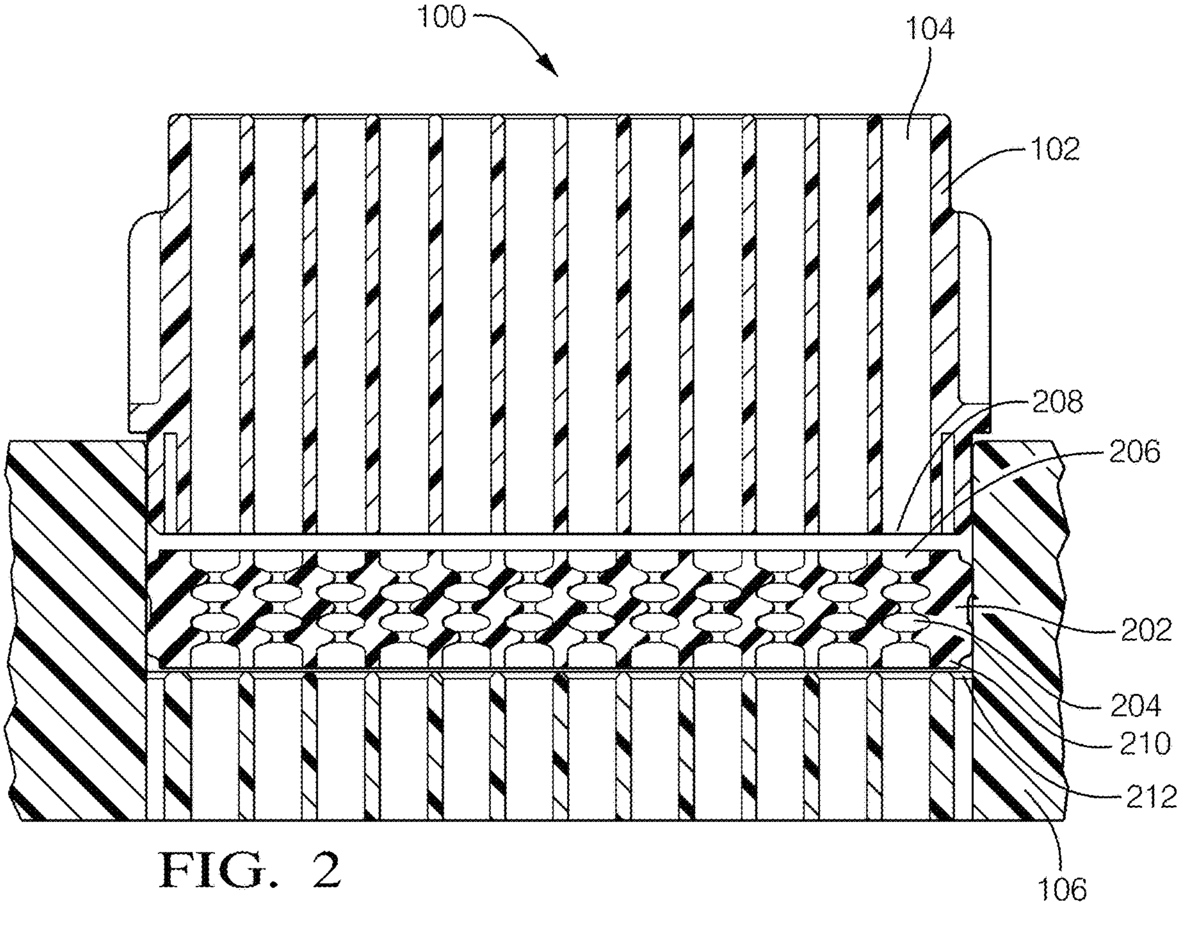
FIG. 2 illustrates a cross section view of the electrical connector assembly of FIG. 1 according to some embodiments.

The electrical connector assembly 100 shown in FIG. 1 includes a connector housing 102 having a plurality of terminal cavities 104 in which electrical terminals attached to wire cables (not shown) are received. The electrical connector assembly 100 also includes a mat seal 202 that is formed of a compliant material and has a plurality of seal apertures 204 through which the electrical terminals are inserted into the plurality of terminal cavities 104. The mat seal 202 is shown in FIG. 2. The electrical connector assembly 100 further includes a housing seal retainer 106 that is configured to secure the mat seal 202 to the connector housing 102. The housing seal retainer 106 is connected to the connector housing 102 by flexible members 108 that are attached to the connector housing 102 and are configured to urge the mat seal 202 into contact with the connector housing 102 while allowing longitudinal movement of the housing seal retainer 106 relative to the connector housing 102. While the connector housing 102 of the illustrated example includes two flexible members 108 located on opposed, e.g., top and bottom, sides of the connector housing 102, alternative embodiments of the assembly may be envisioned that include a single flexible member or that include more than two flexible members. Further, while the flexible members 108 of the illustrated example are attached to the connector housing 102, alternative embodiments of the assembly may be envisioned wherein the flexible members 108 are attached to the housing seal retainer 106. The dashed lines in FIG. 1 show optional protection features formed in the housing 108 that enclose the flexible members 108 and protect them from damage caused by contact with other elements.

As discussed in the BACKGROUND above, the mat seal 202 is subject to longitudinal deformation due to insertion of terminals through the seal apertures 204 and/or thermal expansion and contraction of the mat seal 202.

Figure 3:
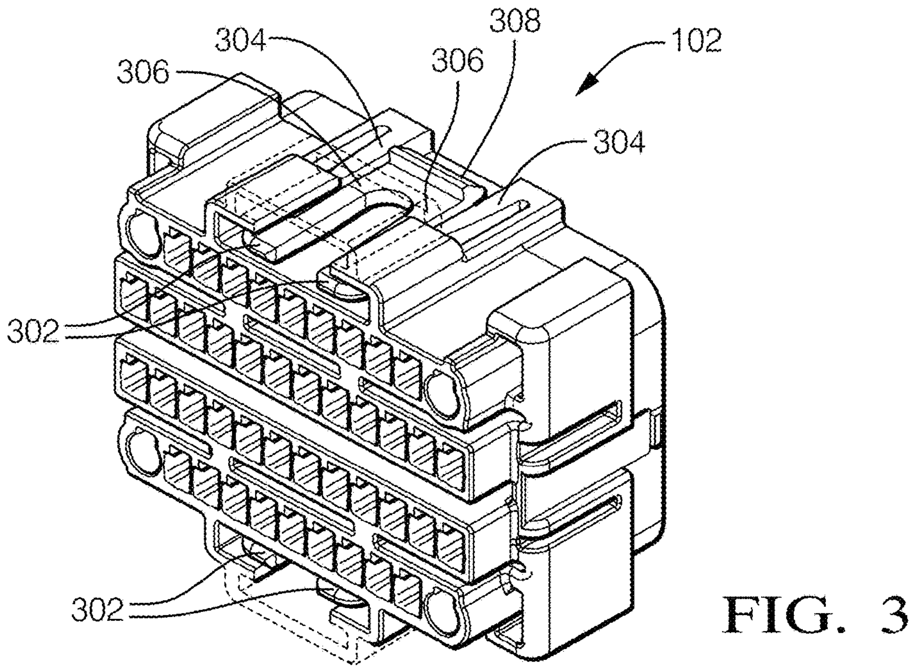
FIG. 3 illustrates an isometric view of a connector housing of the electrical connector assembly of FIG. 1 according to some embodiments.
Figure 4:
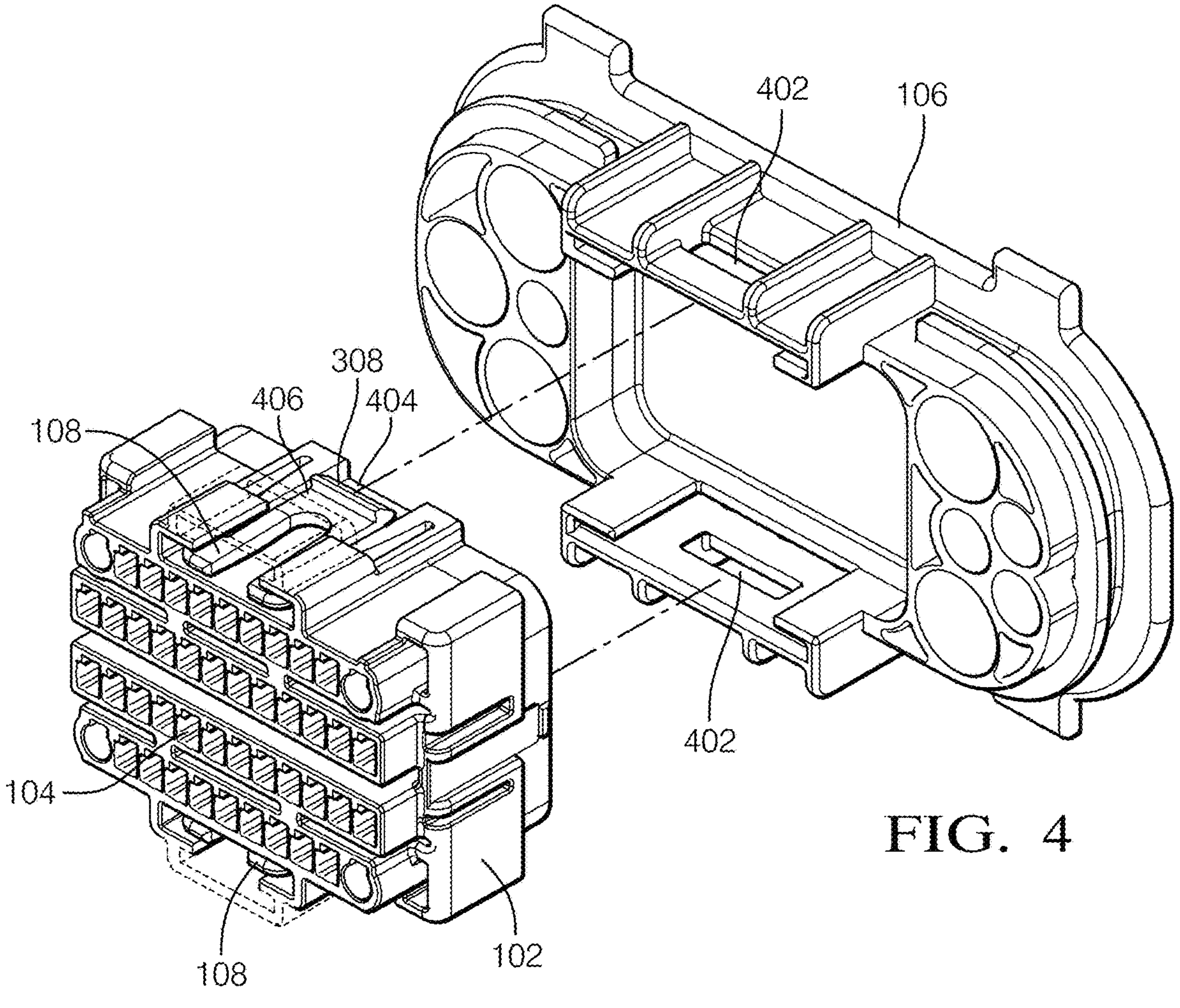
FIG. 4 illustrates an exploded view of the connector housing and a seal retainer of the electrical connector assembly of FIG. 1 according to some embodiments.
Figure 5:
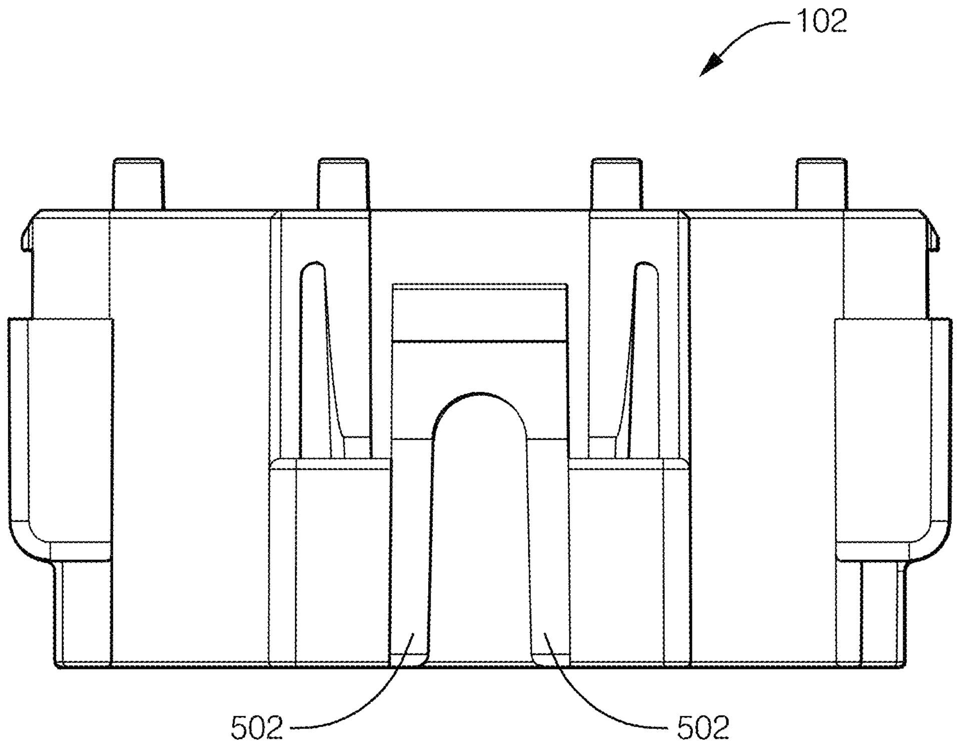
FIG. 5 illustrates a top view of the connector housing of FIG. 3 according to some embodiments.
Figure 6:
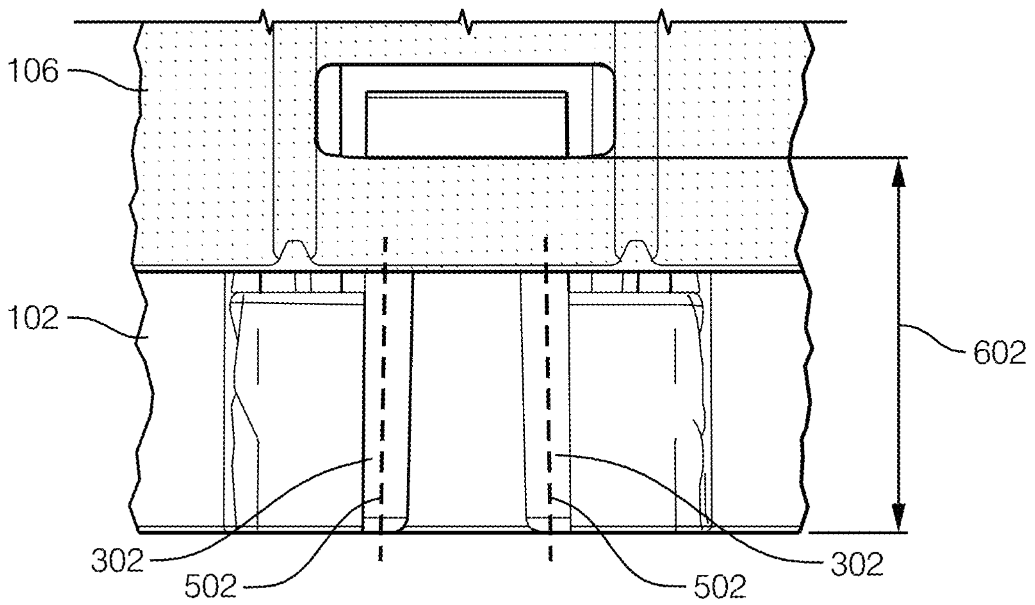
FIG. 6 illustrates a top view of an electrical connector assembly of FIG. 1 with a flexible member connecting the connector housing and a seal retainer in an unflexed condition according to some embodiments.
Figure 7:
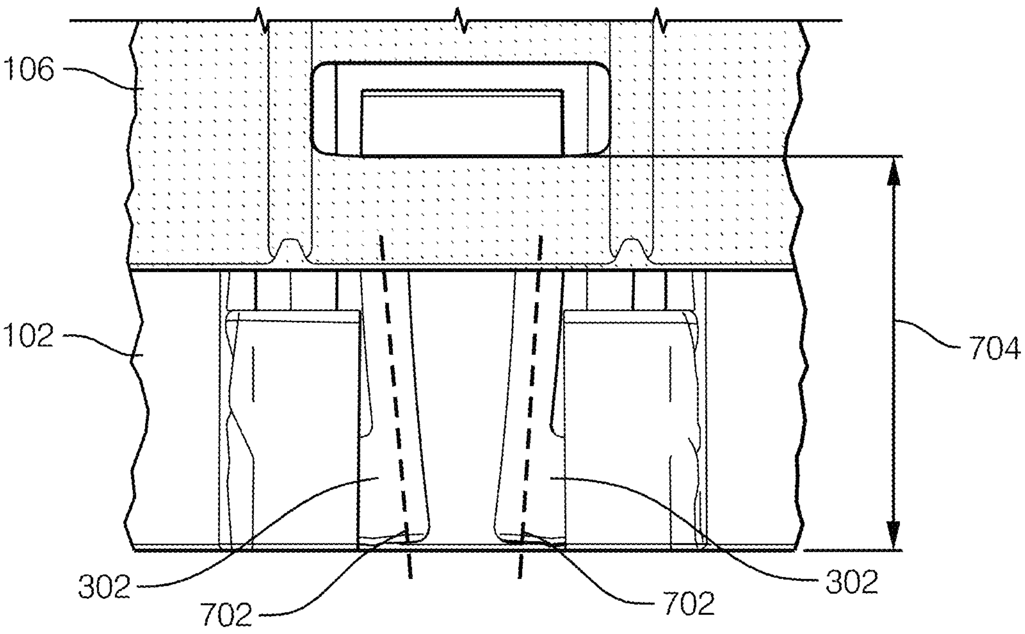
FIG. 7 illustrates a top view of an electrical connector assembly of FIG. 1 with the flexible member connecting the connector housing and a seal retainer in a partially flexed condition according to some embodiments.
Figure 8:
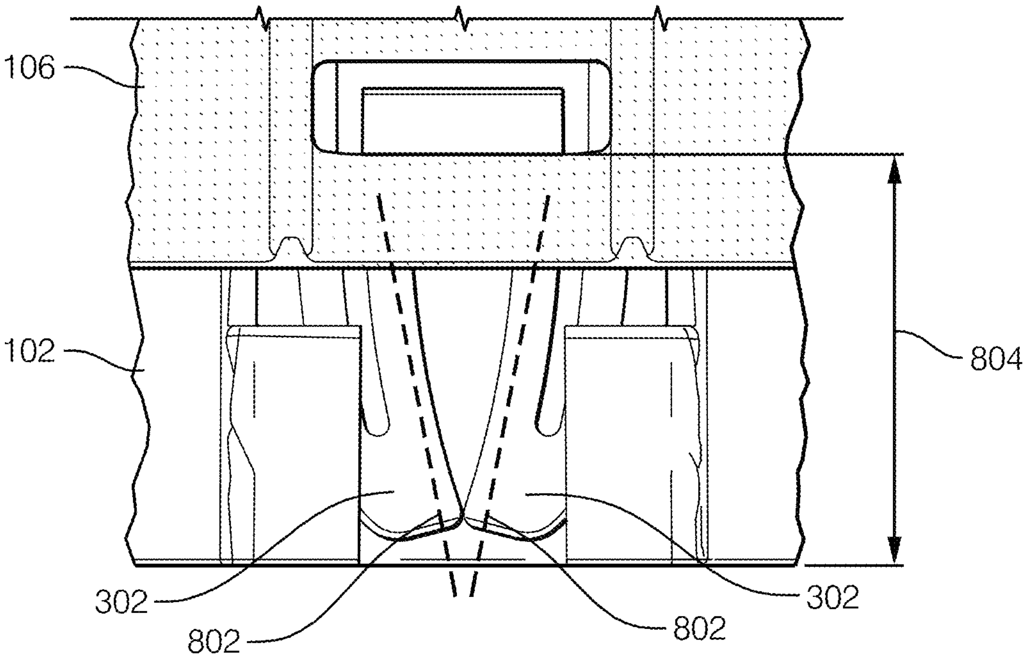
FIG. 8 illustrates a top view of an electrical connector assembly of FIG. 1 with the flexible member connecting the connector housing and a seal retainer in a fully flexed condition according to some embodiments.

As best shown in FIGS. 3 to 5, each of the flexible members 108 include a pair of resilient cantilever arms 302 that connect the housing seal retainer 106 to the connector housing 102. Each of the cantilever arms 302 has a fixed end 304 attached to the connector housing 102 and a free end 306 connected to a locking latch 308 that is configured to engage a locking aperture 402 in the housing seal retainer 106 (see FIG. 4). Each of the cantilever arms 302 has two 180° bends to form a generally S-shaped arm that allows the cantilever arms 302 to bend inwardly from a neutral position 502 shown in FIGS. 5 and 6 toward the mesial portion of the connector housing 102 as a distance 602 between the connector housing 102 and the housing seal retainer 106 increase to distance 704 shown in FIG. 7 and distance 804 shown in FIG. 8 as the connector housing 102 and the housing seal retainer 106 move away from one another to displaced positions 702, 802 as shown in FIGS. 7 and 8 to accommodate longitudinal expansion of the mat seal 202. Since the cantilever arms 302 are resilient, they function as springs and bend outwardly toward the distal portion of the connector housing 102 to move the connector housing 102 and the housing seal retainer 106 toward one another. In other embodiments, the flexible members 108 may include alternative spring-like elements that perform the same or similar functions of the cantilever arms 302.

Figure 9:
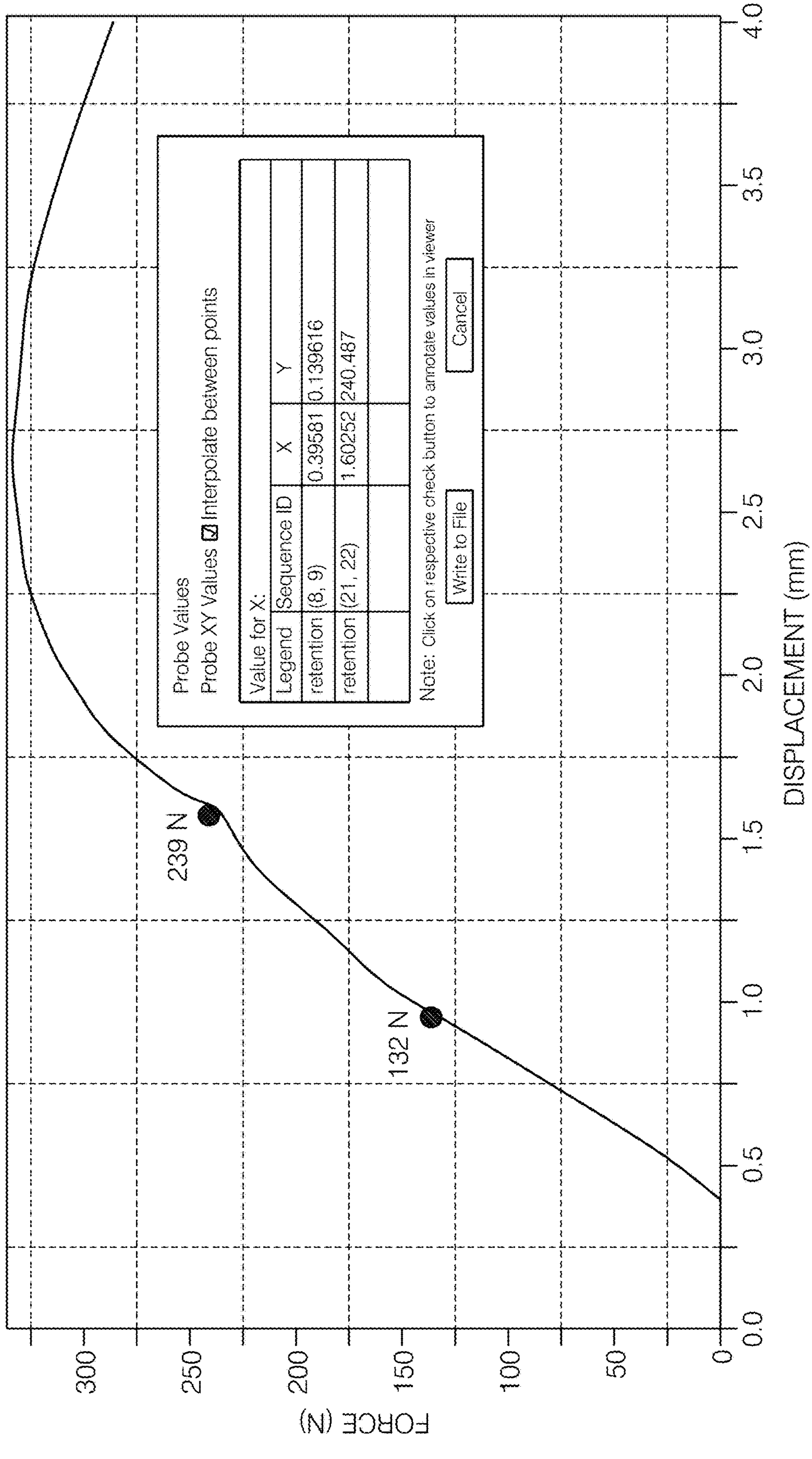
FIG. 9 illustrates a force vs. displacement curve for the conditions shown in FIGS. 6 through 8 according to some embodiments.

The flexible members 108 provide at least 1.5 mm of longitudinal travel between the connector housing 102 and the housing seal retainer 106 to accommodate expansion and contraction of the mat seal 202 therebetween. A force vs. displacement curve for the transition from the neutral position 502 shown in FIG. 5 to the displaced positions 702, 802 shown in FIGS. 7 and 8 are contained in FIG. 9. As can be seen in FIG. 9, even in the fully flexed condition of the cantilever arms 302 shown in FIG. 8, the flexible members 108 attaching the connector housing 102 to the housing seal retainer 106 provide a retention force surpassing the 110 newton threshold required for various electrical connector specifications, such as those published by the United States Council for Automotive Research.

Preferably, the flexible members 108 maintain contact between a forward face 206 of the mat seal 202 and a rearward face 208 of the connector housing 102 while also maintaining contact between a rearward face 210 of the mat seal 202 and a forward face 212 of the housing seal retainer 106. This maintained contact between the forward face 206 of the mat seal 202 and the rearward face 208 of the connector housing 102 and maintained contact between the rearward face 210 of the mat seal 202 and the forward face 212 of the housing seal retainer 106 inhibits bowing of the mat seal 202 as the electrical terminals are pushed through the seal apertures 204 when the electrical terminals are inserted into the plurality of terminal cavities 104.

In the illustrated example of FIG. 4, the locking latch 308 defines a locking ramp having a leading edge 404 that is generally arranged at an acute angle to the cantilever arms 302. Contact of the leading edge 404 with the housing seal retainer 106 flexes the cantilever arms 302 in a lateral direction that is generally orthogonal to the plane in which the cantilever arms 302 flex from the neutral position 502 to accommodate longitudinal movement between the connector housing 102 and the housing seal retainer 106. The locking ramp also has a trailing edge 406 generally arranged at right angle to the cantilever arms 302. The trailing edge 406 is configured to engage the locking aperture 402 in the housing seal retainer 106, thereby allowing the cantilever arms 302 to resiliently flex back to the neutral position 502. Alternative embodiments may be envisioned in which the housing seal retainer 106 defines a locking ramp, and the connector housing 102 defines a locking aperture.

Figure 10:
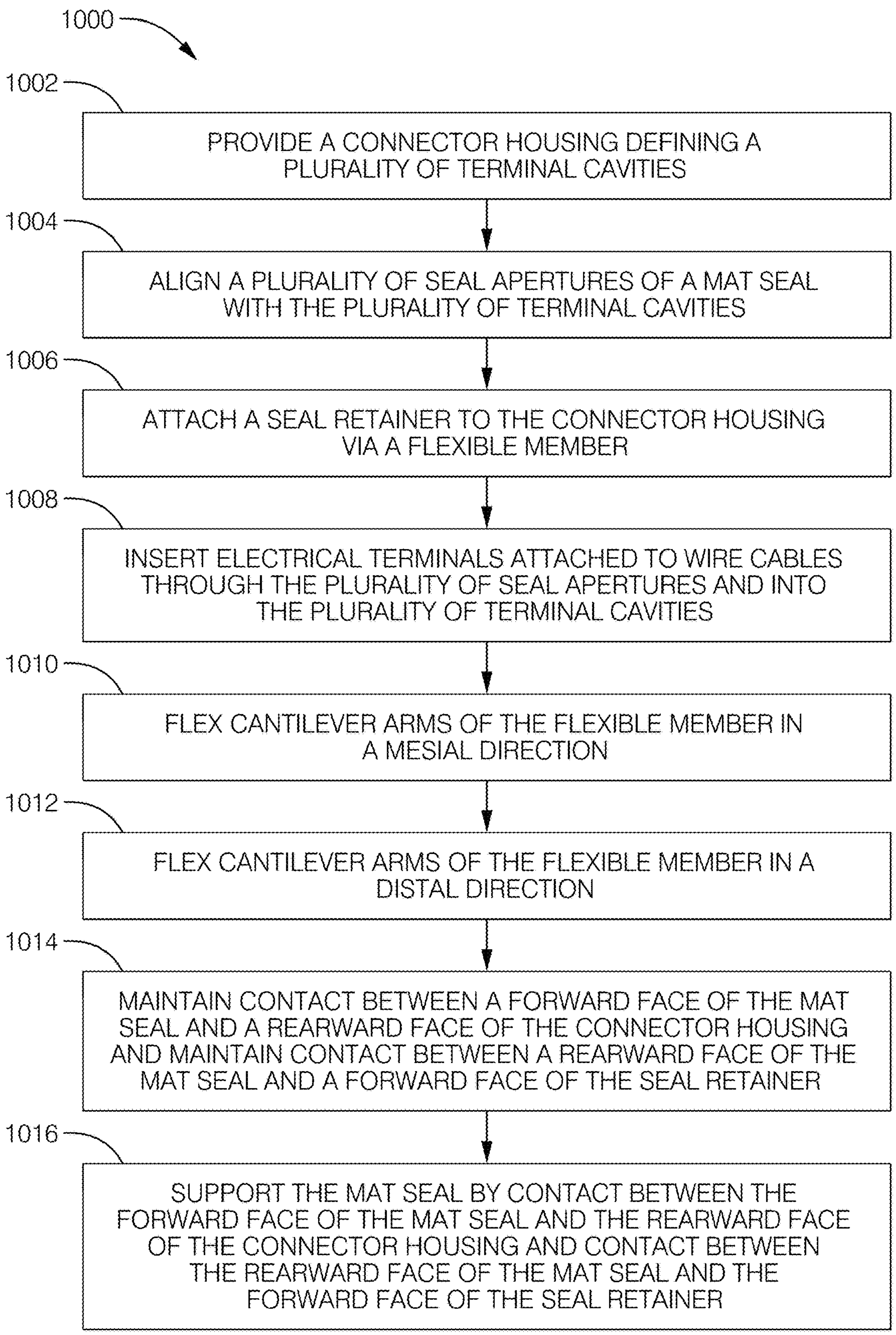
FIG. 10 illustrates a flow chart for a method of assembling an electrical connector according to some embodiments.

A method 1000 of assembling an electrical connector, such as electrical connector assembly 100 is shown in FIG. 10 and includes the following steps:

STEP 1002, PROVIDE A CONNECTOR HOUSING DEFINING A PLURALITY OF TERMINAL CAVITIES incudes providing a connector housing 102 defining a plurality of terminal cavities 104;

STEP 1004, ALIGN A PLURALITY OF SEAL APERTURES OF A MAT SEAL WITH THE PLURALITY OF TERMINAL CAVITIES, includes aligning a plurality of seal apertures 204 of a mat seal 202 with the plurality of terminal cavities 104;

STEP 1006, ATTACH A SEAL RETAINER TO THE CONNECTOR HOUSING, includes attaching a housing seal retainer 106 to the connector housing 102. The mat seal 202 is disposed between the housing seal retainer 106 and the connector housing 102. The housing seal retainer 106 is attached to the connector housing 102 via a flexible member 108 that is configured to urge the mat seal 202 into contact with the connector housing 102 and allow longitudinal movement of the housing seal retainer 106 relative to the connector housing 102;

STEP 1008, INSERT ELECTRICAL TERMINALS ATTACHED TO WIRE CABLES THROUGH THE PLURALITY OF SEAL APERTURES AND INTO THE PLURALITY OF TERMINAL CAVITIES, includes inserting electrical terminals attached to wire cables through the plurality of seal apertures 204 and into the plurality of terminal cavities 104;

STEP 1010, FLEX CANTILEVER ARMS OF THE FLEXIBLE MEMBER IN A MESIAL DIRECTION, includes flexing cantilever arms 302 of the flexible member 108 in a mesial direction in response to an increase in a longitudinal distance between the connector housing 102 and the housing seal retainer 106 or in response to thermal expansion of the mat seal 202, thereby increasing a longitudinal distance between the connector housing 102 and the housing seal retainer 106;

STEP 1012, FLEX CANTILEVER ARMS OF THE FLEXIBLE MEMBER IN A DISTAL DIRECTION, includes flexing the cantilever arms 302 in a distal direction in response to thermal contraction of the mat seal 202, thereby decreasing a longitudinal distance between the connector housing 102 and the housing seal retainer 106;

STEP 1014, MAINTAIN CONTACT BETWEEN A FORWARD FACE OF THE MAT SEAL AND A REARWARD FACE OF THE CONNECTOR HOUSING AND MAINTAIN CONTACT BETWEEN A REARWARD FACE OF THE MAT SEAL AND A FORWARD FACE OF THE SEAL RETAINER, includes maintaining contact between a forward face 206 of the mat seal 202 and a rearward face 208 of the connector housing 102 and maintaining contact between a rearward face 210 of the mat seal 202 and a forward face 212 of the housing seal retainer 106 by mesial and distal flexing of the flexible member 108; and STEP 1016, SUPPORT THE MAT SEAL BY CONTACT BETWEEN THE FORWARD FACE OF THE MAT SEAL AND THE REARWARD FACE OF THE CONNECTOR HOUSING AND CONTACT BETWEEN THE REARWARD FACE OF THE MAT SEAL AND THE FORWARD FACE OF THE SEAL RETAINER, includes supporting the mat seal 202 by contact between the forward face 206 of the mat seal 202 and the rearward face 208 of the connector housing 102 and contact between the rearward face 210 of the mat seal 202 and the forward face 212 of the housing seal retainer 106 to inhibit bowing of the mat seal 202 as the electrical terminals are inserted into the plurality of terminal cavities 104.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

a connector housing defining a plurality of terminal cavities in which electrical terminals attached to wire cables are received;

a mat seal formed of a compliant material and having a plurality of seal apertures through which the electrical terminals are inserted into the plurality of terminal cavities; and a seal retainer, wherein the mat seal is disposed between the seal retainer and the connector housing, wherein the seal retainer is connected to the connector housing by a flexible member configured to urge the mat seal into contact with the connector housing and allow longitudinal movement of the seal retainer relative to the connector housing; and wherein the flexible member includes a pair of resilient cantilever arms connecting the seal retainer to the connector housing and wherein each cantilever arm has two 180° bends.

2. The electrical connector assembly according to claim 1, wherein the cantilever arms are configured to resiliently flex in a mesial direction in response to an increase in a longitudinal distance between the connector housing and the seal retainer.

3. The electrical connector assembly according to claim 1, wherein the flexible member provides at least 1.5 mm of longitudinal travel between the connector housing and the seal retainer due to expansion or contraction of the mat seal.

4. The electrical connector assembly according to claim 1, wherein fixed ends of the cantilever arms are attached to the connector housing and wherein free ends of the cantilever arms are attached to a locking latch configured to engage a locking feature on the seal retainer.

5. The electrical connector assembly according to claim 4, wherein the locking latch defines a locking ramp having a leading edge arranged at an acute angle to the cantilever arms and configured to resiliently flex the cantilever arms in a lateral direction from a neutral position and the locking ramp also having a trailing edge arranged at right angle to the cantilever arms and configured to engage a locking aperture of the locking feature on the seal retainer, thereby allowing the cantilever arms to resiliently flex to the neutral position.

6. The electrical connector assembly according to claim 1, wherein the cantilever arms are configured to resiliently flex in a mesial direction in response to thermal expansion of the mat seal, thereby increasing a longitudinal distance between the connector housing and the seal retainer.

7. The electrical connector assembly according to claim 6, wherein the cantilever arms are configured to resiliently flex in a distal direction in response to thermal contraction of the mat seal, thereby decreasing the longitudinal distance between the connector housing and the seal retainer.

8. The electrical connector assembly according to claim 1, wherein the flexible member is configured to maintain contact between a forward face of the mat seal and a rearward face of the connector housing while maintaining contact between a rearward face of the mat seal and a forward face of the seal retainer.

9. The electrical connector assembly according to claim 8, wherein maintained contact between the forward face of the mat seal and the rearward face of the connector housing and maintained contact between the rearward face of the mat seal and the forward face of the seal retainer is configured to inhibit bowing of the mat seal as the electrical terminals are inserted into the plurality of terminal cavities.

10. A method of assembling an electrical connector, comprising:

providing a connector housing defining a plurality of terminal cavities;

aligning a plurality of seal apertures of a mat seal with the plurality of terminal cavities;

attaching a seal retainer to the connector housing via a flexible member, wherein the mat seal is disposed between the seal retainer and the connector housing and wherein the seal retainer is configured to urge the mat seal into contact with the connector housing and allow longitudinal movement of the seal retainer relative to the connector housing; and inserting electrical terminals attached to wire cables through the plurality of seal apertures and into the plurality of terminal cavities, wherein the flexible member includes a pair of resilient cantilever arms connecting the seal retainer to the connector housing and wherein each cantilever arm has two 180° bends.

11. The method according to claim 10, further comprising flexing cantilever arms in a mesial direction in response to an increase in a longitudinal distance between the connector housing and the seal retainer.

12. The method according to claim 10, wherein the flexible member provides up to 1.5 mm of longitudinal travel between the connector housing and the seal retainer due to expansion or contraction of the mat seal.

13. The method according to claim 10, wherein fixed ends of the cantilever arms are attached to the connector housing and wherein free ends of the cantilever arms are attached to a locking latch configured to engage a locking feature on the seal retainer.

14. The method according to claim 13, wherein the locking latch defines a locking ramp having a leading edge arranged at an acute angle to the cantilever arms and configured to resiliently flex the cantilever arms from a neutral position and having a trailing edge arranged at right angle to the cantilever arms and configured to engage a locking aperture of the locking feature on the seal retainer and allow the cantilever arms to resiliently flex to the neutral position.

15. The method according to claim 10, further comprising flexing the cantilever arms in a mesial direction in response to thermal expansion of the mat seal, thereby increasing a longitudinal distance between the connector housing and the seal retainer.

16. The method according to claim 15, further comprising flexing the cantilever arms in a distal direction in response to thermal contraction of the mat seal, thereby decreasing the longitudinal distance between the connector housing and the seal retainer.

17. The method according to claim 10, further comprising maintaining contact between a forward face of the mat seal and a rearward face of the connector housing and maintaining contact between a rearward face of the mat seal and a forward face of the seal retainer by mesial and distal flexing of the flexible member.

18. The method according to claim 17, further comprising supporting the mat seal by contact between the forward face of the mat seal and the rearward face of the connector housing and contact between the rearward face of the mat seal and the forward face of the seal retainer to inhibit bowing of the mat seal as the electrical terminals are inserted into the plurality of terminal cavities.

* * * * *